United States Patent
Blum et al.

(10) Patent No.: US 8,842,174 B2
(45) Date of Patent: Sep. 23, 2014

(54) METHOD AND APPARATUS FOR SECURING PLANAR ORIENTATION OF ANALYSIS CHAMBER

(75) Inventors: John Blum, Somerset, NJ (US); John J. Doskoczynski, Millstone, NJ (US); Kaushal K. Verma, Franklin Park, NJ (US); Pierre R. Emeric, Princeton, NJ (US)

(73) Assignee: Abbott Point of Care, Inc., Princeton, NJ (US)

( * ) Notice: Subject to any disclaimer, the term of this patent is extended or adjusted under 35 U.S.C. 154(b) by 752 days.

(21) Appl. No.: 12/977,908

(22) Filed: Dec. 23, 2010

(65) Prior Publication Data

US 2011/0157343 A1    Jun. 30, 2011

Related U.S. Application Data

(60) Provisional application No. 61/291,688, filed on Dec. 31, 2009.

(51) Int. Cl.
| | |
|---|---|
| H04N 7/18 | (2006.01) |
| B65G 47/24 | (2006.01) |
| G02B 21/34 | (2006.01) |
| G02B 21/26 | (2006.01) |

(52) U.S. Cl.
CPC ............... *G02B 21/26* (2013.01); *G02B 21/34* (2013.01); *H04N 7/18* (2013.01)
USPC ................... 348/61; 348/79; 348/98; 414/754

(58) Field of Classification Search
USPC .......................................................... 348/61
See application file for complete search history.

(56) References Cited

U.S. PATENT DOCUMENTS

| 3,848,962 A | 11/1974 | Nelson |
| 5,812,312 A | 9/1998 | Lorincz |

(Continued)

FOREIGN PATENT DOCUMENTS

| FR | 1002636 | 3/1952 |
| WO | 9120009 | 12/1991 |
| WO | 2008069355 | 6/2008 |

OTHER PUBLICATIONS

International Search Report for PCT/US10/62045, Jun. 14, 2011.

(Continued)

*Primary Examiner* — Joseph Ustaris
*Assistant Examiner* — William Adrovel
(74) *Attorney, Agent, or Firm* — O'Shea Getz P.C.

(57) ABSTRACT

An apparatus and method for imaging a biologic fluid sample quiescently residing within a chamber is provided. The chamber includes a first panel and a second panel, between which the biologic fluid sample quiescently resides. At least one of the first and second panels is flexible. The chamber has one or more fields that are each defined by a cross-sectional area. The apparatus comprises a field illuminator, a chamber flattener, a positioner, and an image dissector. The field illuminator has an objective lens. The chamber flattener has a platen with a window and a cover plate. The chamber flattener is operable to cause the chamber to assume a substantially uniform Z-axis position for substantially all of the fields within the chamber. The positioner is adapted to position the objective lens and the chamber relative to one another. The image dissector is adapted to image the sample residing within the chamber.

14 Claims, 5 Drawing Sheets

(56) References Cited

U.S. PATENT DOCUMENTS

| | | | |
|---|---|---|---|
| 7,027,221 B2* | 4/2006 | Hamborg | 359/383 |
| 7,850,916 B2 | 12/2010 | Wardlaw | |
| 2002/0177184 A1* | 11/2002 | Mielzynska et al. | 435/40.5 |
| 2003/0197925 A1 | 10/2003 | Hamborg | |
| 2007/0243117 A1 | 10/2007 | Wardlaw | |
| 2008/0187466 A1 | 8/2008 | Wardlaw | |
| 2009/0251691 A1 | 10/2009 | Shibata et al. | |
| 2009/0257632 A1 | 10/2009 | Lalpuria et al. | |
| 2011/0090563 A1 | 4/2011 | Krasov | |

OTHER PUBLICATIONS

Japanese Office action for JP2012-547174 dated Jun. 3, 2014.

* cited by examiner

METHOD AND APPARATUS FOR SECURING PLANAR ORIENTATION OF ANALYSIS CHAMBER

Applicant hereby claims priority benefits under 35 U.S.C. §119(e) of U.S. Provisional Patent Application No. 61/291,688 filed Dec. 31, 2009, the disclosure of which is herein incorporated by reference.

BACKGROUND OF THE INVENTION

1. Technical Field

The present invention relates to methods and apparatus for imaging biologic specimens disposed within an analysis chamber in general, and to methods and apparatus for disposing the chamber in a planar orientation in particular.

2. Background Information

Historically, biologic fluid samples such as whole blood, urine, cerebrospinal fluid, body cavity fluids, etc., have had their particulate or cellular contents evaluated by smearing a small undiluted amount of the fluid on a slide and evaluating that smear under a manually operated microscope. Different areas of the smear were examined by manipulating the slide in an X-Y plane. Focus was accomplished by altering the position of one or both of the slide and the microscope objective along the Z-axis. Reasonable results were attainable using these techniques, but they relied heavily upon the technician's experience and technique. Manually examining the various fields of the sample is also labor intensive and therefore not practically feasible for commercial laboratory applications.

Automated apparatus capable of analyzing quiescent biologic fluid samples within a chamber are known. These devices typically maintain the sample in an X-Y plane. Image focus is accomplished by moving one or both of the sample or the device optics relative to the other along a Z-axis. To efficiently perform such an analysis, it is necessary to provide such focus at different heights in an accurate, rapid manner.

SUMMARY OF THE DISCLOSURE

According to an aspect of the present invention, an apparatus for imaging a biologic fluid sample quiescently residing within a chamber is provided. The chamber includes a first panel and a second panel, between which the biologic fluid sample quiescently resides. At least one of the first and second panels is flexible. The chamber has one or more fields that are each defined by a cross-sectional area. The apparatus comprises a field illuminator, a chamber flattener, a positioner, and an image dissector. The field illuminator has an objective lens. The chamber flattener has a platen with a window and a cover plate. The chamber flattener is operable to cause the chamber to assume a substantially uniform Z-axis position for substantially all of the fields within the chamber. The positioner is adapted to position the objective lens and the chamber relative to one another. The image dissector is adapted to image the sample residing within the chamber.

According to another aspect of the present invention, an apparatus for orienting a biologic fluid sample chamber relative to an objective lens is provided. The apparatus includes a platen and a cover plate. The platen includes a window and a magnetic source. The cover plate has a chamber contact panel with a chamber aperture and at least one deflectable flap contiguous with the chamber aperture. The chamber contact panel includes a magnetically attractive material. The cover plate is positioned relative to the platen to allow the chamber to be disposed there between. The magnetic source and the chamber contact panel are sufficiently attracted to one another such that at least one panel of the chamber disposed between the cover plate and platen assumes a substantially planar position.

According to another aspect of the present invention, a method for imaging a biologic fluid sample quiescently residing between a first panel and a second panel of a chamber is provided. At least one of the first and second panels is flexible, and the chamber has one or more fields that are each defined by the cross-sectional area. The method includes the steps of: a) positioning the chamber at a Z-axis position relative to an objective lens; b) flattening the chamber so that it assumes a substantially uniform Z-axis position for substantially all of the fields within the chamber; c) moving one or both of the chamber and the objective lens relative to one another to bring the sample in focus; and d) imaging the biologic fluid sample through the platen window.

The present method and advantages associated therewith will become more readily apparent in view of the detailed description provided below, including the accompanying drawings.

DETAILED DESCRIPTION OF THE INVENTION

Figure 1:
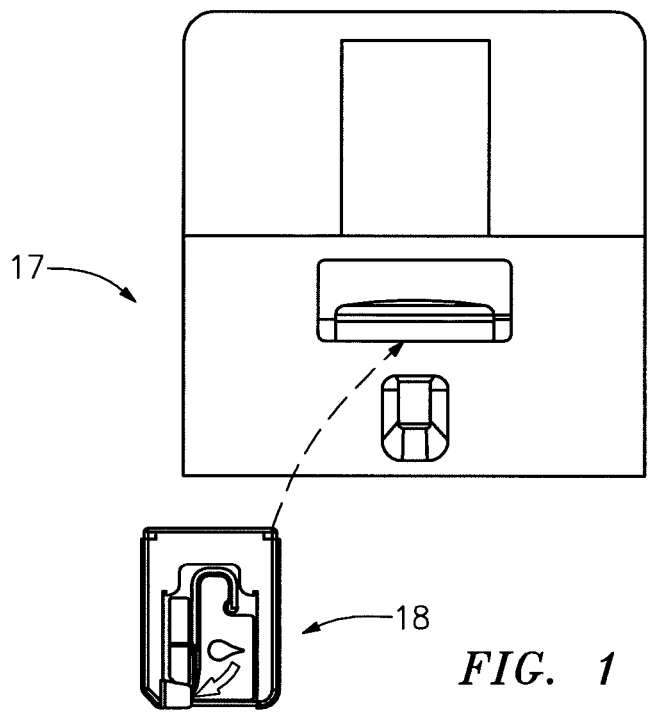
FIG. 1 is a diagrammatic illustration of the present analysis apparatus.
Figure 2:
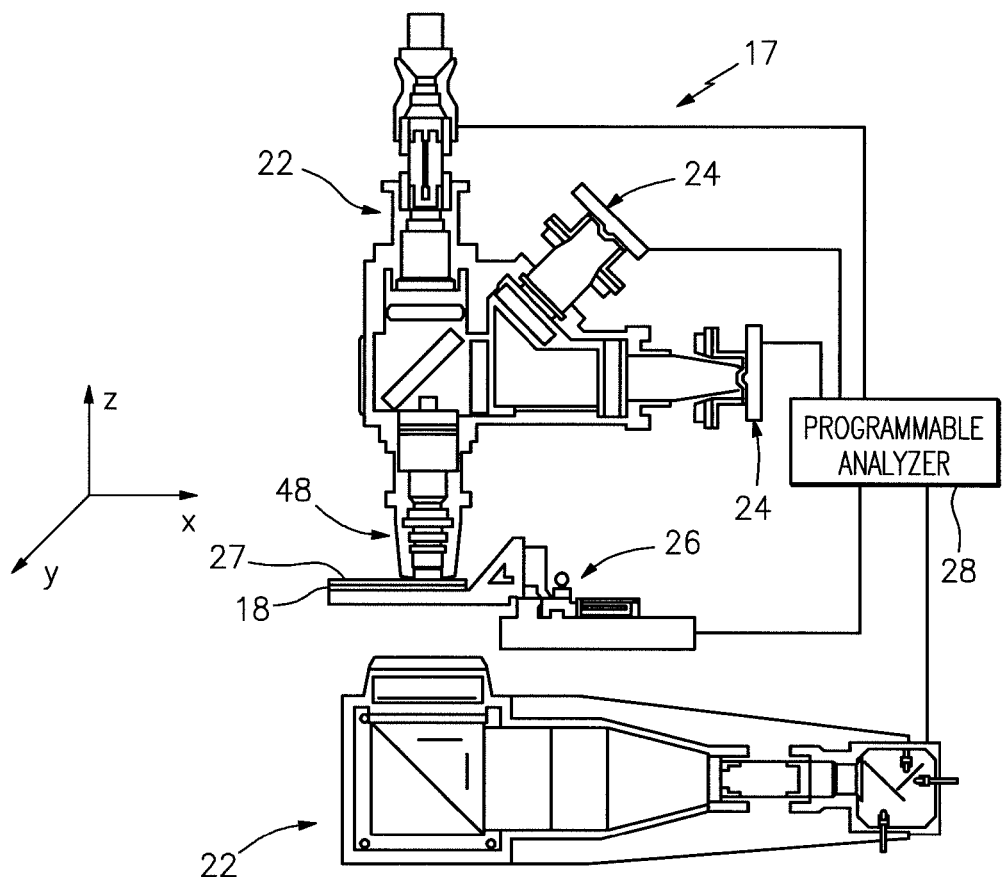
FIG. 2 is schematic representation of the analysis present apparatus.

Referring to FIGS. 1-2, the analysis apparatus 17 is configured to receive a sample analysis cartridge 18 having an analysis chamber 20 (e.g., see FIGS. 4-5) adapted to contain a biologic sample (e.g., anti-coagulated, whole blood) from a subject for analysis. The apparatus 17 includes a field illuminator 22, an image dissector 24, a positioner 26, an analysis chamber flattener 27, and a programmable analyzer 28. For purposes of this description, the terms "analyze" and "analysis" shall be defined as any examination or evaluation of the fluid sample, including but not limited to, the examination (e.g., visual, enumeration, etc.) of constituents within the biologic fluid sample.

The analysis apparatus 17 can be used with a variety of different sample analysis chambers 20, including those described in co-pending U.S. patent application Ser. Nos. 61/287,955 filed Dec. 18, 2009; Ser. No. 12/061,394; and Ser. No. 10/599,695, each of which are incorporated herein by reference in its entirety. For purposes of this disclosure, unless otherwise noted, the invention will be described as using the analysis chamber and cartridge described in U.S. patent application Ser. No. 61/287,955. The present invention is not limited, however, to use with the aforesaid chamber 20 and cartridge 18.

Figure 3:
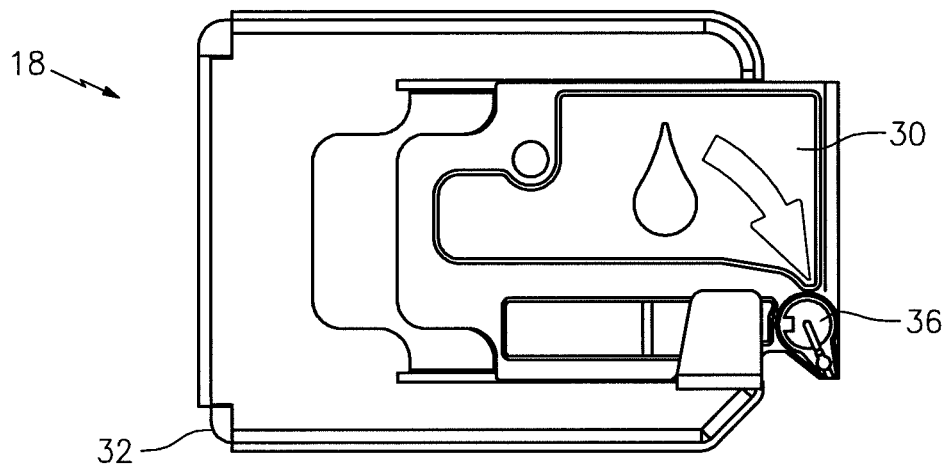
FIG. 3 is a diagrammatic planar view of an embodiment of a sample analysis cartridge, illustrating a fluid module portion of the cartridge in an open position.
Figure 4:
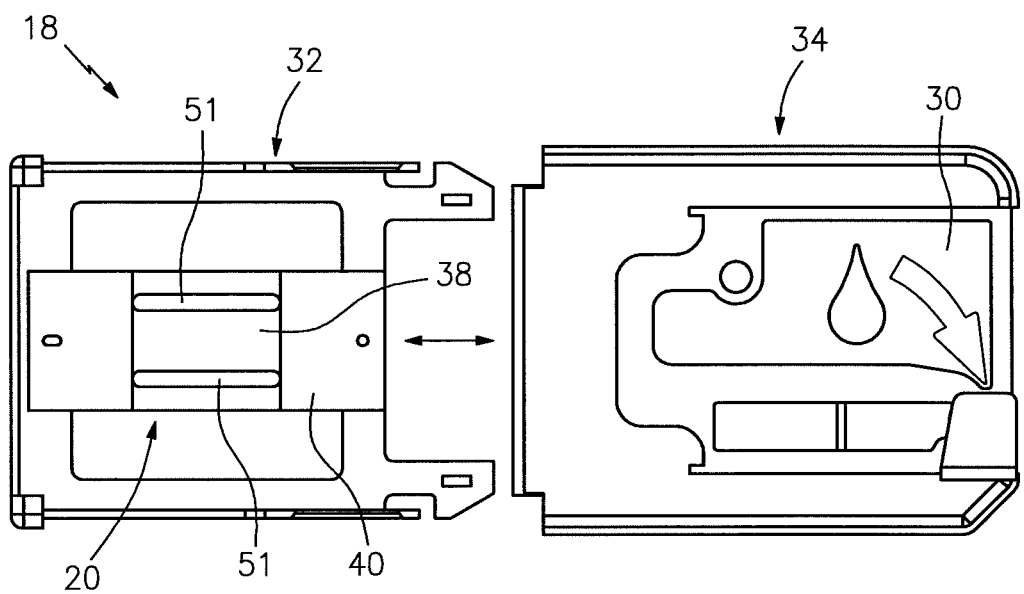
FIG. 4 is a partially exploded view of the cartridge shown in FIG. 3 with the fluid module closed in the housing, and an imaging tray portion disposed outside of the housing.
Figure 5:
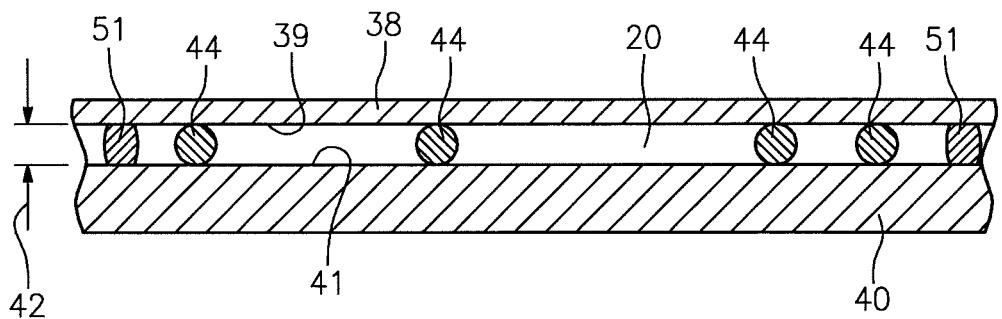
FIG. 5 is a diagrammatic sectioned partial view of an analysis chamber.

Referring to FIGS. 3-5, the sample analysis cartridge 18 includes a fluid module 30, an image tray 32, and a housing 34. The fluid module 30 includes a sample port 36 configured to receive a fluid sample from either a syringe or a subject collection site; e.g., from a finger or heel stick, or from a sample drawn from an arterial or venous source. The fluid sample is subsequently drawn into the cartridge 18 where it can be selectively transferred to an analysis chamber 20 located within the image tray 32.

Referring to FIG. 5, the analysis chamber 20 includes a first panel 38 and a second panel 40, at least one of which is sufficiently transparent to permit a biologic fluid sample disposed between the panels 38, 40 to be imaged for analysis purposes. The first and second panels 38, 40 are preferably parallel and aligned with one another, and are separated from each other by a distance extending between the opposing surfaces 39, 41 of the two panels 38, 40. The alignment between the panels 38, 40 defines an area wherein light can be transmitted perpendicular to one panel 38, and it will pass through that panel, the sample, and the other panel 40 as well, if the other panel is also transparent. The separation distance between the panel surfaces (also referred to as the "height" 42 of the chamber 20) is sized such that a biologic fluid sample disposed between the two surfaces 39, 41 will be in contact with both surfaces 39, 41.

In some embodiments, including the embodiment disclosed in U.S. patent application Ser. No. 10/599,695, the first and second panels 38, 40 are separated from one another by at least three separators 44 (typically spherical beads). Examples of acceptable separators include polystyrene spherical beads that are commercially available, for example, from Thermo Scientific of Fremont, Calif., U.S.A., catalogue no. 4204A, in four micron (4 μm) diameter. At least one of the panels 38, 40 or the separators 44 is sufficiently flexible to permit the chamber height 42 to approximate the mean height of the separators 44. The relative flexibility provides the chamber 20 with a substantially uniform height despite minor dimensional tolerance variances in the separators 44. In those embodiments where one of the one of the panels (e.g., first panel 38) is formed from a material more flexible than the separators 44 and the other panel (e.g., second 40), the more flexible panel 38 will overlay the separators 44 and to the extent that a particular separator 44 is larger than the surrounding separators 44, the flexible panel 38 will flex around the larger separator 44 in a tent-like fashion. In this manner, although small local areas may deviate from the mean chamber height 42, the mean height of all the chamber sub-areas (including the tented areas) will be very close to that of the mean separator diameter. Consequently, for purposes of establishing a substantially uniform Z-axis chamber position, the deviations of the flexible panel are inconsequential.

In some embodiments, a bead 51 of adhesive material (e.g., a UV-curable glue) is disposed between the panels 38, 40, and is operable to attach the panels 38, 40 to one another.

Examples of acceptable panel materials include transparent plastic film, such as acrylic, polystyrene, polyethylene terphthalate (PET), cyclic olefin copolymer (COC) or the like. In some embodiments, one of the panels (e.g., the panel oriented to be the bottom) is formed from a strip of material with a thickness of approximately fifty microns (50μ), and the other panel (e.g., the panel oriented to be the top panel) is formed from the same material but having a thickness of approximately twenty-three microns (23μ).

The chamber 20 is typically sized to quiescently hold about 0.2 to 1.0 μl of sample, but the chamber 20 is not limited to any particular volume capacity, and the capacity can vary to suit the analysis application. The term "quiescent" is used to describe that the liquid sample is deposited within the chamber 20 for analysis, and is not purposefully moved during the analysis. To the extent that sample motion is present within the chamber, it will predominantly be due to Brownian motion of formed constituents within the sample, which motion is not disabling of the use of this invention.

Now referring back to FIG. 2, the field illuminator 22 includes a light source and objective optics (e.g., objective lens 48, filters, etc.). The light source produces light throughout a wavelength range broad enough to be useful for a plurality of analyses (e.g., approximately 340 nm to 670 nm). The light source can produce light from a single source or from a plurality sources that collectively produce the light along the desired wavelengths; e.g., a zenon arc lamp, a tungsten halogen lamp, LEDs, or a pulsatile source.

The path of the light emanating from the illuminator 22 will depend upon the whether the sample is being analyzed using fluorescence or transmittance. When fluorescence is used, an objective lens 48 focuses light emanating from the light source within the illuminator 22 into a light beam which, in turn, is directed into the sample quiescently residing within the chamber 20. The light beam illuminates at least one field of the sample, which field is defined by the cross-sectional area of the sample image which impinges on the image dissector 24, or a portion thereof. The light causes material within the sample (e.g., fluorescent dye) to fluoresce and emit light of a particular wavelength. The emitted light passes back through the objective lens 48 and is subsequently captured by an image dissector 24. When transmittance is used, the field illuminator 22 is configured to direct light through the chamber first panel 38 and second panel 40 (which are both sufficiently transparent to allow the light to pass there through), and the fluid sample residing there between. The transmitted light passes through the objective lens 48 and is subsequently captured by an image dissector 24.

The positioner 26 is adapted to change the relative positions of the objective lens 48 and the analysis chamber 20. A change in the relative positions of the objective lens 48 and the analysis chamber 20 can be accomplished in a variety of different ways; e.g., by moving one of the objective lens 48 and analysis chamber 20 relative to the other along all relevant axes (e.g., X, Y, and Z), or by moving the chamber 20 along particular axes (e.g., the X and Y axes) and the lens along the other axis (e.g., the Z-axis), etc. For ease of description, the positioner 26 is described herein as being adapted to move the cartridge 18 and incorporated analysis chamber 20 along multiple axes of motion (e.g., X, Y, and Z) relative to a stationary objective lens 48. The present invention is not limited to this embodiment, however. The chamber 20 is movable in the X-Y plane to permit the objective lens 48 to capture all fields of the sample residing within the chamber 20, and movable along the Z-axis to change the focal position relative to the sample height. Motion of the chamber 20 relative to the objective lens 48 can be accomplished by a variety of different devices, including but not limited to, a controllable stepper motor that can be operated to selectively produce either continuous motion of the chamber 20 relative to the objective lens 48 or incremental movement of the chamber 20 relative to the objective lens 48.

An acceptable image dissector 24 is a complimentary metal-oxide semi-conductor (CMOS) type digital image dissector 24, preferably one that can provide at least eight (8), and most preferably twelve (12), bits of resolution per pixel. The image dissector 24 converts an image of the light into an electronic data format which can be seen and/or interpreted in real-time or at a subsequent time, using a data file version of the image. Alternatively, an image dissector 24 other than a CMOS may be used to convert the image of light into an electronic data format.

Figure 6:
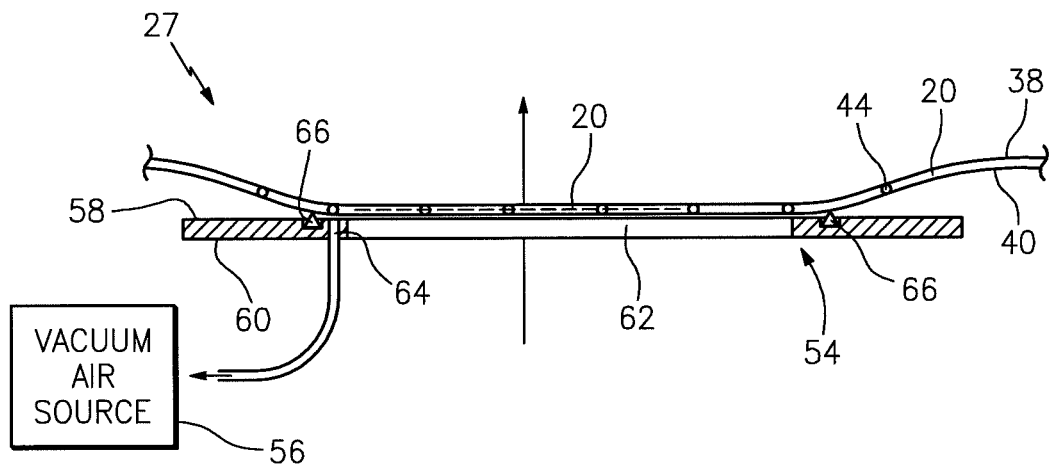
FIG. 6 is a diagrammatic view of an analysis chamber and a chamber flattener embodiment.
Figure 7:
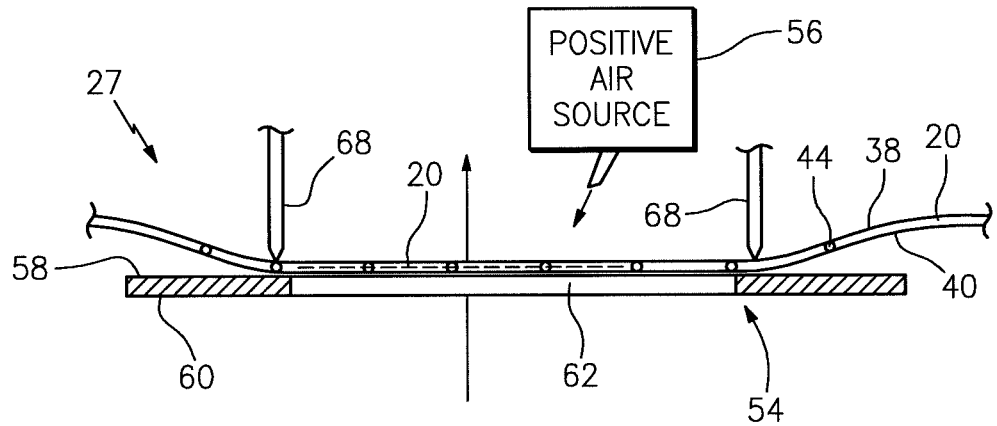
FIG. 7 is a diagrammatic view of an analysis chamber and a chamber flattener embodiment.

Referring to FIGS. 6-7, the analysis chamber flattener 27 is adapted to manipulate a flexible analysis chamber panel (e.g., one or both of the analysis chamber panels 38, 40) into a flat, planar orientation to facilitate the relative positioning of the sample chamber 20 and the objective lens 48 (see FIG. 2). A flat, planar chamber orientation positions substantially all (and preferably all) of the analysis fields of sample in the same Z-axis position. As a result, the time required to find the Z-axis focal plane within the sample is substantially decreased, and the ability to image all fields within the sample is greatly enhanced.

In a first embodiment shown in FIGS. 6 and 7, the chamber flattener 27 includes a platen 54 and a source of air pressure 56 (e.g., positive air pressure or suction). The platen 54 includes a chamber side surface 58, an opposite side surface 60, and a substantially rigid transparent window 62 extending between the two surfaces 58, 60. The window 62 is sized large enough to permit light to pass through a substantial area of each chamber panel 38, 40 when the chamber 20 is aligned with the window 62; i.e., all of the sample disposed within the chamber 20 is typically viewable through the window 62. FIG. 6 illustrates a chamber flattener 27 embodiment wherein the air pressure source 56 is a vacuum. One or more ports 64 open to the chamber side surface 58 are disposed adjacent the window 62. An air seal 66 disposed outside of the one or more ports 64 is positioned to contact a chamber panel 40. Once the chamber panel 40 is placed in contact with the air seal 66, a vacuum drawn by the air pressure source 56 lowers the pressure within the pocket formed by the chamber panel 40, the platen 54, and the air seal 66. When the pressure drops sufficiently, the chamber panels 38, 40 are drawn against the flat, planar platen window 62. As a result, the sample chamber 20 extending in the X-Y plane is maintained at a substantially uniform Z-axis position for substantially all of the fields containing sample. After the sample is imaged, the vacuum is released.

In the example shown in FIG. 7, the chamber flattener 27 embodiment includes an air pressure source 56 adapted to produce positive pressure air that pushes the sample chamber 20 against the platen window 62. An air seal 68 disposed, for example, on the side of the chamber 20 opposite the platen window 62 is configured to create a pocket for the high pressure air. Once the chamber 20 is aligned with the platen window 62, positive pressure air from the air pressure source 56 is directed into the pocket, consequently pressing the chamber 20 against the flat, planar platen window 62. As a result, the sample chamber 20 extending in the X-Y plane is maintained at a substantially uniform Z-axis position for substantially all of the fields containing sample. After the sample is imaged, the positive air pressure is removed.

Figure 10:
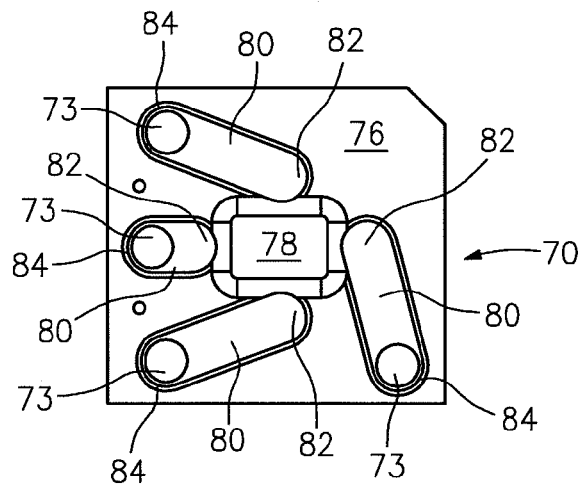
FIG. 10 is an opposite side planar view of the chamber flattener platen embodiment shown in FIG. 9.
Figure 11:
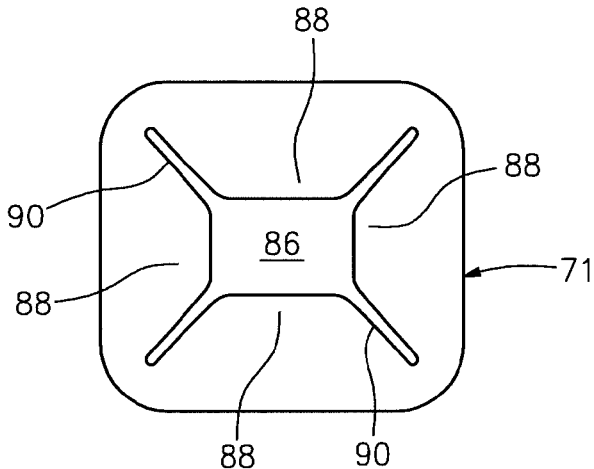
FIG. 11 is a cover plate embodiment.

Referring to FIGS. 8-12, a second embodiment of the chamber flattener 27 includes a platen 70, a cover plate 72, and one or more magnets 73 (see FIG. 10). The platen 70 includes a chamber side surface 74, an second side surface 76, and a substantially rigid transparent window 78 extending between the two surfaces 74, 76. The window 78 is sized large enough to permit light to pass through at least substantially all of the area of the chamber panels 38, 40 when the chamber 20 is aligned with the window 78. In the embodiment shown in FIG. 10, the chamber flattener 27 includes a number of magnets 73 (e.g., four) sufficient to attract the cover plate 72 as will be described below. A slot 80 is disposed in the second side surface 76 of platen 70 for each magnet 73. The slots 80 extend between a first end 82 and a second end 84. The first end 82 of each slot 80 is disposed in close proximity to the window 78, where it will be aligned with the cover plate 72 when the chamber flattener 27 is assembled. The second end 84 of each slot 80 is disposed away from the window 78, where it will not be aligned with the cover plate 72 when the chamber flattener 27 is assembled. The platen 70 is made of a substantially rigid non-magnetic material that can be formed to have a planar chamber side surface 74 within acceptable flatness tolerances.

The cover plate 72 has a chamber contact panel 71, a first side flange 102, and a second side flange 104. The chamber contact panel 71 is a relatively thin flat body that includes a chamber aperture 86 (see FIG. 11) and typically includes at least one flap 88 contiguous with the chamber aperture 86. The chamber contact panel 71 embodiment shown in FIG. 11 has four (4) flaps 88 contiguous with the chamber aperture 86, each separated from the adjacent flaps 88 by a slot 90. The specific geometry of the chamber contact panel 71, including the number of flaps 88, can be altered to accommodate different chamber 20 configurations. The flaps 88 have a cantilevered configuration that allows each to deflect as will be described below. The chamber contact panel 71 can include (or be made from) a material that is attracted by magnets (e.g., 420 series martensitic stainless steel shim stock).

Figure 8:
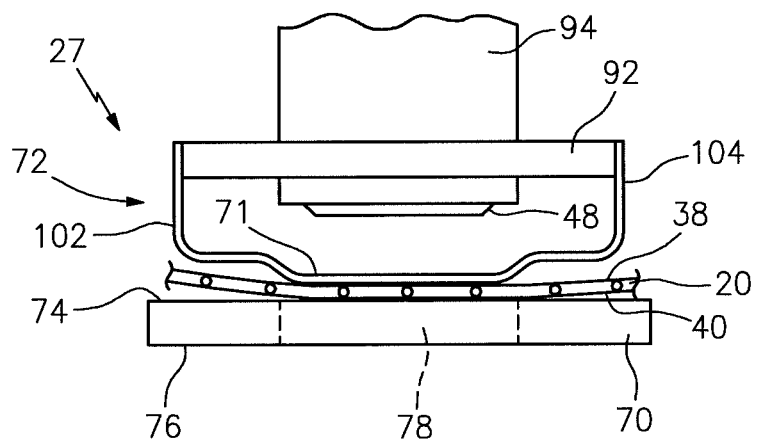
FIG. 8 is a diagrammatic view of an analysis chamber and a chamber flattener embodiment.
Figure 9:
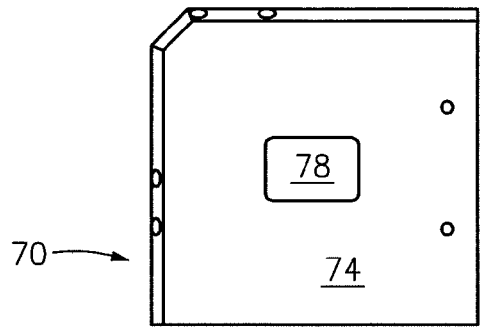
FIG. 9 is a planar view of the chamber side surface of a chamber flattener platen embodiment.
Figure 12:
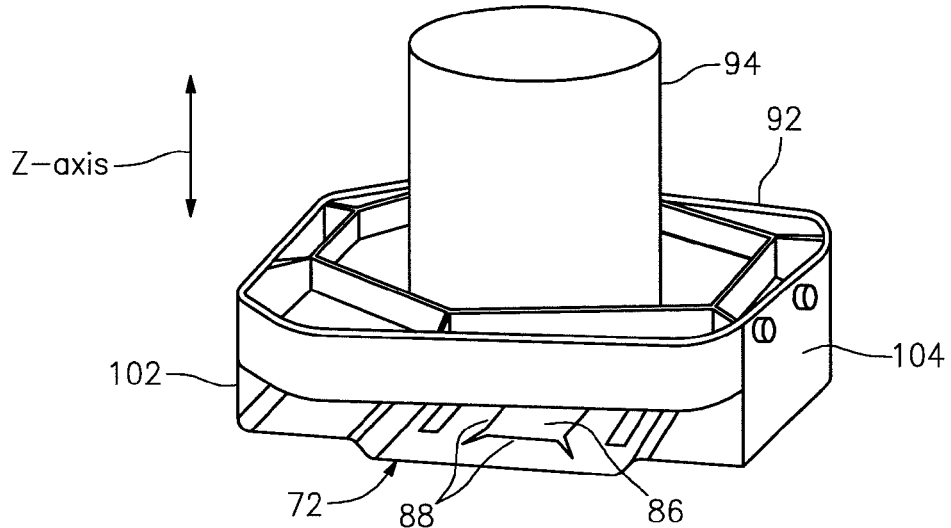
FIG. 12 is a perspective view of a cover plate embodiment and collar mounted on the housing of an objective lens.

In the embodiment shown in FIGS. 8 and 12, the cover plate 72 comprises a first side flange 102 and a second side flange 104. The first side flange 102 and second side flange 104 attach the chamber contact panel 71 to a collar 92 that is slidably attached to the objective lens housing 94. The collar 92 (and attached cover plate 72) are moveable in the Z-axis direction.

Referring to FIGS. 8 and 10, in the operation of the second embodiment of the chamber flattener 27, the platen 70 is disposed in close proximity to the chamber 20. Each magnet 73 is disposed within the second end 84 of a platen slot 80, away from the platen window 78. The objective lens 48 (and attached collar 92 and cover plate 72) is moved toward the chamber 20. After the objective lens 48 moves a distance in the Z-direction, the chamber contact panel 71 portion of the cover plate 72 will contact one of the panels 38 of the chamber 20. If it is necessary to move the objective lens 48 further toward the chamber 20 for focusing, the collar 92 will slide up the objective lens housing 94 and will not impede movement of the objective lens 48 relative to the chamber 20. Either before or after the cover plate 72 contacts the chamber 20, each magnet 73 disposed within a slot 80 is moved from the second end 84 to the first end 82 of the respective slot 80. Movement of the magnet 73 within the slot 80 may be achieved in a number of ways, and the present invention is not limited to any particular embodiment. When each magnet 73 is positioned at the first end 82 of a slot 80, each flap 88 of the chamber contact panel 71 is aligned with one of the first ends 82, and therefore the magnet 73 disposed therein. Each magnet 73 attracts the aligned flap 88 toward the platen 70. As a result, each flap 88 presses the chamber 20 toward the flat, planar chamber side surface 74 of the platen 70, causing the chamber 20 to assume a substantially uniform Z-axis position for substantially all of the fields within the chamber 20. Once the imaging is completed, each magnet 73 is moved to the second end 84 of the respective slot 80, out of alignment with the chamber contact panel 71, thereby releasing the attractive force with the cover plate 72. In alternative embodiments of the chamber flattener, each magnet 73 may be an electromagnet. In these embodiments, the magnets 73 may be disposed in a fixed location within the platen 70, positioned to align with the flaps 88 of the chamber contact panel 71. The operation of the electromagnets is coordinated to provide attractive force as described above.

In alternative embodiments of the second chamber flattener 27, each cartridge 18 can include a chamber contact panel 71 rather than the analysis device having a chamber contact panel 71. In addition, the chamber flattener 27 is described above in terms of an objective lens that is movable toward the analysis chamber. In alternative embodiments, one or both of the objective lens 48 and chamber 20 could be movable toward the other. The chamber flattener 27 is also described above in terms of a chamber contact panel 71 that is attracted to magnets, and magnets disposed within the platen. In alternative embodiments, the chamber contact panel 71 can be made from a magnetic material and the platen from a material that is attracted to magnets. These embodiments illustrate the utility of the present invention, and the present invention is not limited thereto.

Figure 13:
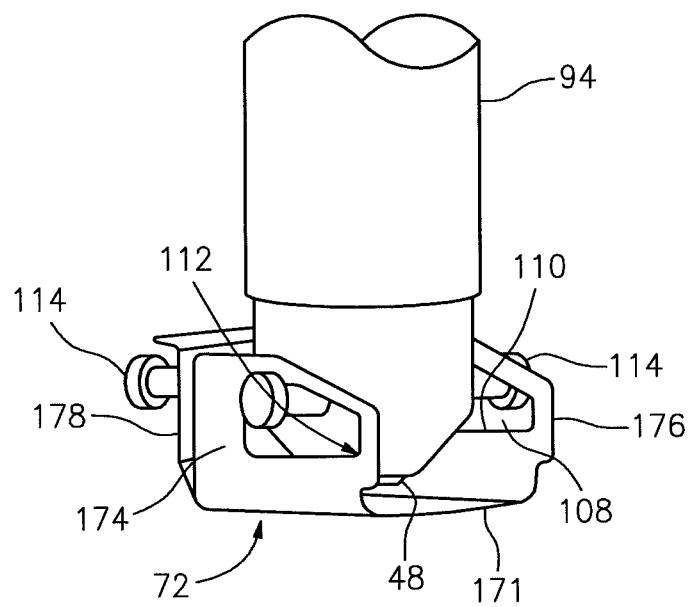
FIG. 13 is a perspective view of a cover plate embodiment mounted on the housing of an objective lens.
Figure 14:
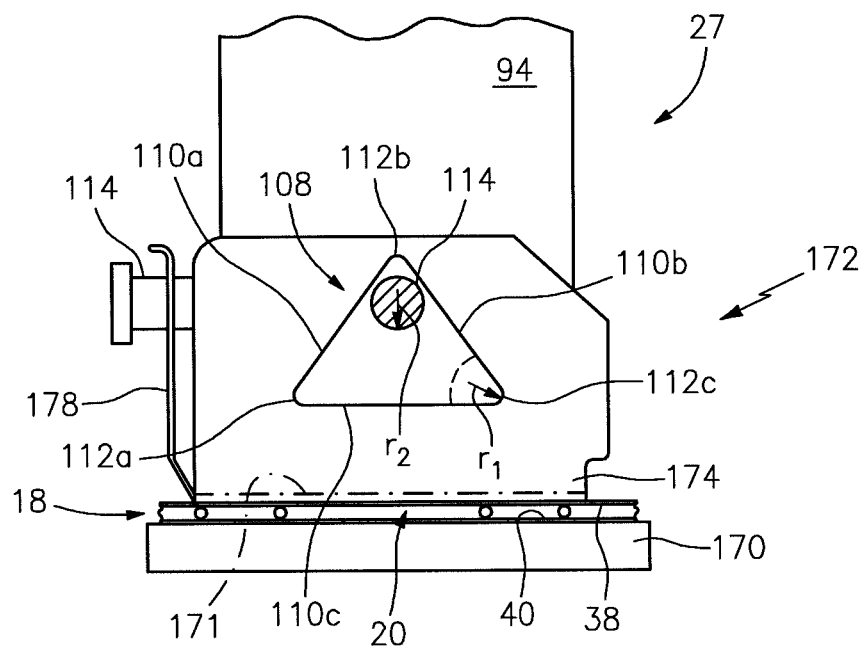
FIG. 14 is a planar view of a cover plate embodiment mounted on the housing of an objective lens.

Referring to FIGS. 13 and 14, a third embodiment of the chamber flattener 27 includes a platen 170, a cover plate 172, and one or more magnets (73; see FIG. 10). The cover plate 172 comprises a first side flange 174, a second side flange 176, a rear flange 178, and a chamber contact panel 171. The flanges 174, 176, 178 each have a cut-out 108. The cut-outs 108 each have three or more flat sections 110 (shown as 110a-c in FIG. 14) and three or more corners 112 (shown as 112a-c in FIG. 14). The corners 112 of the cut-outs 108 each have a radius $r_1$. Three (3) pins 114 are fixed to the objective lens housing 94, protruding outwardly from the objective lens housing 94 in a direction orthogonal to the axis of the objective lens housing 94 (e.g., the Z-axis). The size of each flange cut-out 108 is such that a pin 114 may be inserted therethrough. The pins 114 are oriented about the objective lens housing 94 such that one pin 114 is inserted through the cut-out 108 of the first side flange 102, another pin 114 is inserted through the cut-out 108 of the second side flange 104, and another pin 114 is inserted through the cut-out 108 of the rear flange 106. The pins 114 have a radius $r_2$. The radius $r_2$ of the pins 114 is greater than the radius $r_1$ of the corners 112 of the flange cut-outs 108. In alternative embodiments, the geometry of the corners 112 may not be uniform, and may be other than a radius. In these embodiments, the cross-sectional geometry of the pins 114 is such that no pin 114 can be completely received within one of the corners 112.

In the operation of the third embodiment of the chamber flattener 27, the cartridge 18 and incorporated analysis chamber 20 are initially positioned (i.e., by the positioner 26 as shown schematically in FIG. 2) at a Z-axis position such that they are not in contact with the cover plate 172. The cover plate 172 is maintained at a Z-axis position by the pins 114; the flanges 174, 176, 178 of the cover plate 172 "hang" from the pins 114. In this initial position, each pin 114 contacts a corresponding flange cut-out 108 at exactly two points: e.g., a first flat section 110a and a second flat section 110b. FIG. 14 shows the cover plate 172 just in contact with the top panel 38 of the chamber 20, still supported by the pins 114. Because the radii $r_2$ of the pins 114 are greater than the radii $r_1$ of the corners 112a-c of cut-outs 108, the pins 114 are unable to contact any of the corners 112a-c of the cut-outs 108. This configuration is advantageous because it inhibits rocking of the cover plate 172 as the cover plate 172 hangs from the pins 114, and because it aids in alignment and orientation of the cover plate 172 as the positioner 26 changes the relative positions of the objective lens 48 (see FIG. 15) and the analysis chamber 20.

As the positioner 26 changes the relative Z-axis positions of the analysis chamber 20 and the objective lens 48 and the chamber 20 comes in contact with the cover plate 172, one or more of the flanges 174, 176, 178 of the cover plate 72 are lifted (i.e., they no longer hang) from the pins 114. Magnets disposed within the platen 170 operate in the manner described above to attract the chamber contact panel 171 toward the analysis chamber 20. As a result, each flap 88 (see FIG. 11) of the chamber contact panel 171 presses the chamber 20 toward the flat, planar chamber side surface 74 (see FIG. 9) of the platen 170, causing the chamber 20 to assume a substantially uniform Z-axis position for substantially all of the fields within the chamber 20. If it is necessary to move the chamber 20 further toward the objective lens 48 (i.e., in the Z-axis plane) for focusing, the cover plate 172 (including flanges 174, 176, 178) will not impede movement of the chamber 20 relative to the objective lens 48 to the extent the pins 114 or the objective lens housing 94 do not come in contact with the flanges 174, 176, 178. Similarly, if it is necessary to move the chamber 20 in the X-Y plane to examine different areas of the chamber 20, the cover plate 172 (including flanges 174, 176, 178) will not impede movement of the chamber 20 relative to the objective lens 48 to the extent the pins 114 or the objective lens housing 94 do not come in contact with the flanges 174, 176, 178. Once the imaging is completed, each magnet 73 is moved to the second end 84 of the respective slot 80, out of alignment with the cover plate 172, thereby releasing the attractive force with the cover plate 172.

Referring to FIGS. 5 and 8-12, in a fourth embodiment of the chamber flattener 27, the chamber includes one or both of: 1) a bead 51 of glue that contain magnetic particles disposed between the chamber panels 38, 40 (see FIG. 5); and 2) a coating applied to one or both panels 38, 40 panels, which coating contains magnetic material. This embodiment utilizes a platen 72 similar to that described above in the second embodiment. During operation, the chamber 20 is positioned for imaging with the platen 72 disposed in close proximity to the chamber 20. Each magnet 73 is moved from the second end 84 of the respective slot 80 to the first end 82, adjacent the platen window 78. The magnetic material disposed within the glue beads 51 and/or the coating is attracted to the magnets 73, and the chamber 40 is consequently pressed toward the flat, planar chamber side surface 74 of the platen 70, causing the chamber 20 to assume a substantially uniform Z-axis position for substantially all of the fields within the sample chamber 20. Once the imaging is completed, each magnet 73 is moved to the second end 84 of the respective slot 80, out of alignment with the chamber 20, thereby releasing the attractive force with the chamber 20.

The programmable analyzer 28 includes a central processing unit (CPU) that is adapted (e.g., programmed) to selectively perform the functions necessary to perform the present method. It should be noted that the functionality of the programmable analyzer 28 may be implemented using hardware, software, firmware, or a combination thereof. A person skilled in the art would be able to program the processing unit to perform the functionality described herein without undue experimentation. The programmable analyzer 28 is in communication with and is programmed to coordinate the operation of the field illuminator 22, the image dissector 24, the positioner 26, and the chamber flattener 27 to image the fluid sample quiescently residing within the chamber 20. For example, in those chamber flattener 27 embodiments that utilize a source of air pressure 56 (e.g., positive air pressure or suction) to flatten one or both panels of the chamber 20, the programmable analyzer can be programmed to operate the air pressure source at the appropriate time and in an appropriate manner (e.g., the amount of pressure, duration, etc.) In most instances, the analysis apparatus 17 is operated to image the entire sample within the chamber 20, which process involves imaging multiple fields (e.g., 50-100) of the sample.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. An apparatus for imaging a biologic fluid sample quiescently residing between a first panel and a second panel of a chamber, wherein at least one of the first and second panels is flexible, wherein the chamber has one or more fields that are each defined by a cross-sectional area, comprising:
   a field illuminator having an objective lens disposed within the objective lens housing;
   a chamber flattener having a platen with a window, and a cover plate having a chamber contact panel that includes a chamber aperture and at least one deflectable flap contiguous with the chamber aperture;
   a positioner;
   an image dissector; and
   a programmable analyzer in communication with the field illuminator, the positioner, and the image dissector.

2. The apparatus of claim 1, wherein the platen and chamber contact panel are selectively attracted to one another by magnetic force.

3. The apparatus of claim 2, wherein the platen includes one or more magnets and the chamber contact panel includes a material attracted to the magnets.

4. The apparatus of claim 1, wherein at least one of the platen and chamber contact panel are selectively attracted to the chamber by magnetic force.

5. The apparatus of claim 1, wherein the cover plate comprises a plurality of flanges which attach the cover plate to a collar, wherein the collar is slidably attached to the objective lens housing.

6. The apparatus of claim 1, wherein the cover plate comprises a plurality of flanges, each with a cut-out, and wherein the chamber flattener further comprises a plurality of pins extending outwardly from a housing portion of the field illuminator, each of which pins is received in a cut-out.

7. The apparatus of claim 6, wherein each pin has a cross-sectional geometry and each cut-out has at least three corners connected to one another by transition sections, wherein the cross-sectional geometry of the pin is such that the pin is prevented from contacting the corner by the transition sections.

8. The apparatus of claim 7, wherein the pins and cover plate allow for relative movement between the cover plate and the objective lens in an X-Y plane, and along a Z-axis.

9. The apparatus of claim 1, wherein the chamber flattener further includes an air pressure source operable to produce a pressure force acting on at least one of the panels of the chamber so the chamber assumes a substantially uniform Z-axis position for substantially all of the fields within the chamber.

10. The apparatus of claim 9, wherein the air pressure source produces a suction force that draws the chamber against the platen window.

11. The apparatus of claim 9, wherein the air pressure source produces a positive pressure force that forces the chamber against the platen window.

12. The apparatus of claim 1, further comprising at least one of a bead and a coating disposed with the chamber, which bead and coating includes a material that can be magnetically attracted and wherein the beads and/or the magnetic coating of the chamber panels are attracted to magnets disposed within the platen.

13. An apparatus for orienting a biologic fluid sample chamber relative to an objective lens, comprising:
   a platen having a window and a magnetic source; and
   a cover plate having a chamber contact panel with a chamber aperture and at least one deflectable flap contiguous with the chamber aperture, wherein the chamber contact panel includes a magnetically attractive material, and the cover plate is positioned relative to the platen to allow the chamber to be disposed there between;
   wherein the magnetic source and the chamber contact panel are sufficiently attracted to one another such that at least one panel of the chamber disposed between the cover plate and platen assumes a substantially planar position; and
   wherein the cover plate comprises a plurality of flanges attached to the chamber contact panel and a collar attached to the flanges, wherein the collar is configured to slidably attach to a housing of the objective lens.

14. The apparatus of claim 13, wherein apparatus includes a plurality of pins adapted to attach to a housing of the objective lens, and wherein the cover plate comprises a plurality of flanges, each with a cut-out sized to receive one of the pins.

* * * * *